US00RE36432E

United States Patent [19]

Fennhoff et al.

[11] E Patent Number: Re. 36,432

[45] Reissued Date of Patent: Dec. 7, 1999

[54] PROCESS FOR THE PURIFICATION OF POLYCARBONATE AND POLYESTER CARBONATE SOLUTIONS

[75] Inventors: Gerhard Fennhoff, Willich; Pieter Ooms; Hans-Josef Buysch, both of Krefeld; Ralf Pakull, Köln, all of Germany

[73] Assignee: Bayer Aktiengesellschaft, Leverkusen, Germany

[21] Appl. No.: 08/856,830

[22] Filed: May 15, 1997

Related U.S. Patent Documents

Reissue of:

[64] Patent No.: 5,420,241
Issued: May 30, 1995
Appl. No.: 08/224,455
Filed: Apr. 7, 1994

[30] Foreign Application Priority Data

Apr. 16, 1993 [DE] Germany ..... 43 12 391

[51] Int. Cl.[6] ..... C08F 6/00

[52] U.S. Cl. ..... 528/490; 528/198; 528/480

[58] Field of Search ..... 528/198, 480, 528/490

[56] References Cited

U.S. PATENT DOCUMENTS 3,939,118 2/1976 Horbach et al. ..... 528/499
4,891,421 1/1990 Nishimura et al. ..... 528/370

*Primary Examiner*—Terressa Mosley
*Attorney, Agent, or Firm*—Joseph C. Gil; Aron Preis

[57] ABSTRACT

A process for purifying aromatic carbonate polymers, including polycarbonates and polyestercarbonates, is disclosed. Accordingly, a carbonate polymer is an organic solvent is rendered virtually free of low molecular weight components by agitation with aluminosilicate or by passing through layers of such aluminosilicate. The aluminosilicate is subsequently separated off and the carbonate polymer is isolated in known methods.

10 Claims, No Drawings

PROCESS FOR THE PURIFICATION OF POLYCARBONATE AND POLYESTER CARBONATE SOLUTIONS

Matter enclosed in heavy brackets [ ] appears in the original patent but forms no part of this reissue specification; matter printed in italics indicates the additions made by reissue.

The present invention provides a process for the purification of solutions of aromatic polycarbonates and/or aromatic polyester carbonates from low-molecular organic components, characterized in that solutions of aromatic polycarbonates and/or of aromatic polyester carbonates in organic solvents are agitated with aluminosilicates or passed through layers of alumino-silicates, the aluminosilicates are subsequently separated off, and the polycarbonates and/or polyester carbonates are then isolated by known methods, preferably by evaporation of the solvent or by precipitation by means of non-solvents.

The present invention also provides the polycarbonates, polyester carbonates and their mixtures obtainable by the process according to the invention.

In the production of aromatic polycarbonates, whether homopolycarbonates or copolycarbonates, and/or of aromatic polyester carbonates, there often remain in the polycondensate matrix chemically uncombined, low-molecular building blocks of the synthesis and low-molecular synthetic products as well as molecular-weight regulators, bisphenols, organic carbonates of the molecular-weight regulators used in each case and low-molecular organic carbonates of the bisphenols used in each case.

In the thermoplastic processing of aromatic polycarbonates and/or polyester carbonates, low-molecular substances of the kind mentioned above frequently cause undesirable and disturbing coatings on the tools used in the injection moulding or extrusion apparatuses. Surface defects in the moulded parts produced by this process frequently result. In such cases, waste production material and machine stoppage for cleaning the tools are unavoidable and cause additional production costs.

Furthermore, these low molecular substances often cause slight discolorations of the polycondensates, whose occurrence can be prevented only by additional stabilizers for processing and aging.

It is therefore of great interest to reduce or eliminate the content of the low-molecular substances in the thermoplastic aromatic polycarbonates and/or polyester carbonates in order to eliminate the aforementioned technical and qualitative disadvantages.

It has surprisingly been found that low-molecular building blocks for the synthesis and low-molecular synthetic products can be separated from solutions of polycondensates, as for example of aromatic polycarbonates and/or of aromatic polyester carbonates, by treatment with aluminosilicates such as zeolites.

The use of zeolites for drying solvents and gases is known and described for example in "Organikum, Basic Organic Chemical Laboratory Course, 16th revised edition, VEB Deutscher Verlag der Wissenschaften, Berlin 1986, p. 650".

It is novel, on the other hand, that polycondensate solutions can be separated with zeolites from low-molecular building blocks for synthesis and low-molecular synthetic products, particularly since the polycondensate solutions which, compared with the low-viscosity pure solvents, are highly viscous, unexpectedly do not block the pores of the zeolites, which would necessarily lead to deactivation of the zeolites. According to JA 61-210 057, low-molecular carbonates with ethylenically unsaturated groups are purified by means of inorganic absorbents such as zeolites.

In this case, therefore, only impurities present but not low-molecular carbonates are filtered out by the zeolites. It would therefore have to be expected that in the case of the process according to the invention, low-molecular carbonates are likewise not filtered out by zeolites.

The polycarbonates to be purified are those that are obtained in the well-known production according to the interfacial procedure or according to the solution procedure, the so-called pyridine process. They are polycarbonates with weight-average molecular weights $\overline{M}_w$ (determined in known manner by light scattering measurement or by measurement of the relative viscosity) between 10,000 and 200,000, preferably between 18,000 and 100,000.

The polyester carbonates to be purified are those that are obtained in known manner in production according to the interfacial procedure from aromatic dicarboxylic acid dichlorides, phosgene and diphenols or according to the solution procedure in organic solutions from just these components. They are polyester carbonates with weight-average molecular weights $\overline{M}_w$ (determined in known manner by light scattering measurement or by measurement of the relative viscosity) between 10,000 and 200,000, preferably between 18,000 and 100,000.

Such polycarbonates or polyester carbonates have not only a certain molecular-weight distribution, and therefore a content of oligocarbonates, but also a content of monomeric building blocks.

These polycarbonates or these polyester carbonates are obtained in production as described above as solutions in organic solvents. After the neutral wash and drying, these solutions can be used directly for the purification according to the invention.

The concentration of the polycarbonates or of the polyester carbonates in the solutions has to be between 1 wt % and 30 wt %, preferably between 5 wt % and 20 wt %. These concentrations can optionally be reached by evaporation to low bulk or dilutions of the solutions obtained during the synthesis of the polycarbonates or of the polyester carbonates.

Polycarbonates and polyester carbonates can also be produced in known manner by transesterification in the melt or in the solid phase. Polycarbonates or polyester carbonates produced in such a way can likewise be purified according to the purification process of the invention by dissolving the polycarbonates or the polyester carbonates in organic solvents and purifying these solutions according to the process of the invention, because products produced according to the transesterification also can still contain low-molecular organic construction, for example phenol or diphenyl carbonate.

The purification process according to the invention is carried out at temperatures between 10° C. and 110° C., preferably between 15° C. and 90° C.

The process is carried out without the use of pressure or at pressures up to 10 bar.

The reaction times are between 3 minutes and 600 minutes, according to the nature and amount of the aluminosilicates used.

Polycarbonates to be purified for the purposes of the present invention are those based on diphenols and phosgene, optionally chain stoppers and optionally branching agents, if they are produced according to the solution processes; or those based on diphenols, diaryl carbonates and optionally branching agents, if they are produced according to the transesterification process.

Suitable diphenols are those of formula (I)

$$HO—Z—OH \quad (I),$$

wherein Z is an arylene group with 6 to 30 C atoms, that can be mono- or polynuclear and wherein the aromatic nuclei can be linked by bridge-type crosslinks such as alkylene, alkylidene, cycloalkylene, cycloalkylidene, —O—, —S—, —S—S—, —CO—, —$SO_2$— or by a single bond.

The arylene groups can in addition be substituted by alkyl or halogen.

Suitable diphenols are for example hydroquinone, resorcinol, dihydroxydiphenyls, bis(hydroxyphenyl)alkanes, bis(hydroxphenyl)cycloalkanes, bis(hydroxyphenyl)sulphides, bis(hydroxyphenyl)esters, bis(hydroxphenyl)ketones, bis(hydroxyphenyl)sulphones, bis(hydroxyphenyl)sulphoxides, α,α'-bis(hydroxyphenyl)diisopropylbenzenes, as well as their ring-alkylated and ring-halogenated compounds.

Preferred diphenols are 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,1-bis(3,5-dimethyl-4-hydroxyphenyl)-p-diisopropylbenzene, 2,2-bis(3,5-dichloro-4-hydroxyphenyl)propane, 2,2-bis(3,5-dibromo-4-hydroxyphenyl)propane and 1,1-bis(4-hydroxyphenyl)-3,3,5-trimethylcyclohexane.

Particularly preferred diphenols are 2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, 1,1-bis(4-hydroxyphenyl)cyclohexane and 1,1-bis(4-hydroxyphenyl)-3,3,5,5-trimethylcyclohexane.

The diphenols are known from the literature or can be produced by known processes.

Suitable chain stoppers are preferably monophenols or their chloroformate esters, as for example those of formulae (IIa) and (IIb)

(IIa)

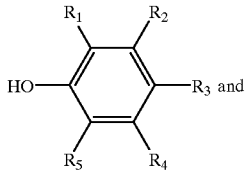

(IIb)

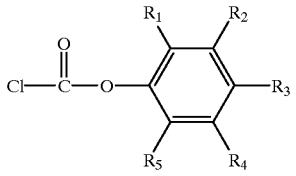

wherein $R_1$ to $R_5$ are the same or different and are H, F, Cl, Br, $CH_3$, $C_2H_5$, $C_3H_7$, isopropyl, $C_4H_9$, tert-butyl, cyclohexyl or aryl. The chain stoppers are known from the literature or can be produced by processes known from the literature.

Examples of preferred chain stoppers (IIa) or molecular-weight regulators are:

p-tert.-butylphenol, p-chlorophenol, 2,4,6-tribromophenol, nonylphenol, octylphenol, isooctylphenol, methylphenols and phenol itself.

Suitable branching agents, used in amounts of 0.005 mol % to 2.0 mol %, relative to diphenols used, are tri- or more than trifunctional compounds, particularly those with three or more than these phenolic OH groups. Some of the branching agents with three or more than three phenolic OH groups are for example:

phloroglucinol, 4,6-dimethyl-2,4,6-tri(4-hydroxyphenyl)heptene-2, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis [4,4-bis(4-hydroxyphenyl)cyclohexyl]propane, 2,4-bis(4-hydroxyphenyl-isopropyl)phenol, 2,6-bis(2-hydroxy-5'-methyl-benzyl)-4-methylphenol, 2-(4-hydroxyphenyl)-2-(2,4-dihydroxyphenyl)propane, hexa(4-(4-hydroxyphenyl-isopropyl)-phenol) or- thoterephthalate, tetra(4-hydroxyphenyl)methane, tetra(4-(4-hydroxyphenyl-isopropyl)phenoxy)methane and 1,4bis(4',4"-dihydroxytriphenyl)methyl)benzene.

Other possible branching agents are 2,4-dihydroxybenzoic acid, trimesic acid, cyanuric chloride and 3,3-bis(3-methyl-4-hydroxyphenyl)-2-oxo-2,3-dihydroindole.

The branching agents are known from the literature or can be produced by processes known from the literature.

Suitable diaryl carbonates are those of formula (III)

(III)

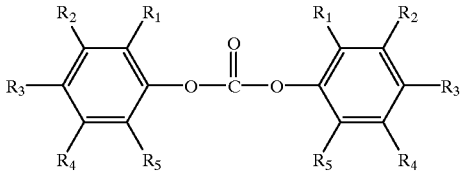

wherein $R_1$ to $R_5$ have the meaning indicated for formulae (IIa) and (IIb).

The diaryl carbonates are known from the literature or can be produced by processes known from the literature.

Particularly preferred diaryl carbonates (III) are those from p-tert.-butylphenol and/or p-chlorophenol and/or 2,4,6-tribromophenol and/or nonylphenol and/or octylphenol and/or isooctylphenol and/or methylphenols and/or phenol itself.

Polyester carbonates for purification for the purposes of the present invention are those based on diphenols, phosgene and aromatic dicarboxylic acid dihalides, optionally chain stoppers and optionally branching agents, if they are produced according to the solution process; or those based on diphenols, diaryl carbonates, dicarboxylic acid diesters and optionally branching agents, if they are produced according to the transesterification process.

Suitable diphenols are again those of formula (I).

Suitable dicarboxylic acids for the dicarboxylic acid dihalides are those of formula (IV)

$$HOOC—Ar—COOH \quad (IV),$$

wherein

Ar is an aromatic mono- or binuclear group, that can be fused or bridged and can have 6 to 18 C atoms. The Ar groups can also be substituted by alkyl or halogen, in particularly by $CH_3$, Cl or Br.

Suitable aromatic dicarboxylic acids are for example orthophthalic acid, terephthalic acid, isophthalic acid, tert.-butylisophthalic acid, 3,3'-diphenyldicarboxylic acid, 4,4'-diphenyldicarboxylic acid, 4,4'-benzophenonedicarboxylic acid, 3,4'-benzophenonedicarboxylic acid, 4,4'-diphenyletherdicarboxylic acid, 4,4'-diphenylsulphonedicarboxylic acid, 2,2-bis(4-carboxyphenyl)propane, trimethyl-3-phenylindane-4,5'-dicarboxylic acid.

Preferred dicarboxylic acids are terephthalic acid and isophtahlic acid and their mixtures. The dihalides are obtainable in known manner from the dicarboxylic acids (IV). Preferred dihalides are the dichlorides.

Suitable chain stoppers are again those of formulae (IIa) and (IIb).

Suitable branching agents are likewise those already names for the production of polycarbonate and, beyond those, in particular aromatic tricarboxylic acids and aromatic tetracarboxylic acids.

Suitable diaryl carbonates are again those of formula (III).

Suitable dicarboxylic acid diesters are the dialkyl esters of the dicarboxylic acids (IV), in particular those of formula (V)

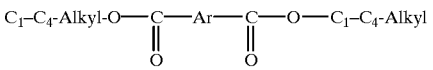

(V)

wherein

—Ar— has the meaning named for formula (IV) and wherein $C_1$–$C_4$ alkyl is in particular $CH_3$, $C_2H_5$, n—$C_2H_7$ and n—$C_4H_9$.

Aluminosilicate suitable according to the invention are zeolites and sheet silicates (also pillard clays).

The zeolites to be used in the process according to the invention are crystalline aluminosilicates, synthetic or naturally occurring, with three-dimensional network structure (see D. W. Breck in "Zeolite Molecular Sieves", Wiley Interscience, 1974, pp. 133–180; Ullmanns Encyclopedia of Industrial Chemistry, 4th Edition, Volume 17, pp. 9–18, Verlag Chemie, Weinheim, New York).

Suitable zeolites are in particular compounds of the general formula $$M_{2/n}O—Al_2O_3—xSiO_2—yH_2O,$$

in which

M represents protons or metal cations of Groups Ia, IIa, IIIa, IVa, Va, VIa, VIIa, VIIIa, Ib, IIb, IIIb and IVb, preferably protons or metal cations of Groups Ia, IIa, IIIb, IVa and IVb, particularly protons or metal cations of Groups Ia, IIa, IIb and IIIb, especially protons or the cations $Na^+$, $K^+$, $Cs^+$, $Ca^{2+}$, $Mg^{2+}$, $Zn^{3+}$, $Pr^{3+}$ and $Ce^{3+}$, n represents the valency of the cation, x represents the molar ratio $SiO_2/Al_2O_3$, wherein x can be a number from 1.0 to 50.0, preferably from 2.0 to 25.0 and y represents a number from 0 to 9.

Materials suitable for the process according to the invention are zeolites of the structure A, X, Y (faujasite type), ZSM 5, 11, 22, 23, mordenite, offretite, phillipsite, sodalite, omega and zeolite-like materials such as AlPO's and SAPO's; particularly suitable materials are zeolites of the structure A, X, Y (faujasite type), L, ZSM 5, 11, mordenite, offretite, omega and SAPO 5 and 11; especially suitable materials are zeolites of the structure A, X, Y (faujasite type), ZSM 5 and mordenite.

The sheet silicates to be used according to the invention are known as such from the literature, see e.g. Kirk-Othmer "Encyclopedia of Chemical Technology" 2nd Ed. 1964, Vol. 5, pp. 541–561.

Suitable materials for the process according to the invention, as classified in the article mentioned, are e.g. kaolin types such as kaolinite, dickite, nacrite (all $Al_2O_3$ x $2SiO_2$x $2H_2O$) or anauxite ($Al_2O_3$ x $3SiO_2$ x $2H_2O$) or halloysite ($Al_2O_3$ x $2SiO_2$ x $2H_2O$) or endellite ($Al_2O_3$ x $2SiO_2$ x $4H_2O$) as well as the spinel types produced from kaoline types by heating.

Furthermore, serpentine types ($Mg_3Si_2O_5(OH)_4$), in which, starting from the kaolin types, 3 Mg ions have replaced 2 Al ions. The serpentine types furthermore include amesite ($^-(Mg_2Al)(SiAl)O_5(OH)_4$) and cronstedite ($Fe_2^{2+}$ $Fe^3$+) ($SiFe^{3+}$)$O_5(OH)_4$ as well as chamosite ($Fe^{2+}$,$Mg)_{2.3}$ $(Fe^{3+}Al)_{0.7}(Si_{1.14}Al_{0.86})O_5(OH)_4$ as well as nickel or cobalt species, some of which are available synthetically.

Furthermore, aluminosilicates of the montmorillonite type can be used, as e.g.

| | |
|---|---|
| montmorillonite | $[Al_{1.67}Mg_{0.33}(Na_{0.33})]Si_4O_{10}(OH)_2$ |
| beidellite | $Al_{2.17}[Al_{0.33}(Na_{0.33})Si_{3.17}O_{10}(OH)_2$ |
| nontronite | $Fe^{3+}[Al_{0.33}(Na_{0.33})Si_{3.67}O_{10}(OH)_2$ |
| hectorite | $Mg_{2.67}Li_{0.33}(Na_{0.33})Si_4O_{10}(OH,F)_2$ |
| saponite | $Mg_{3.0}[Al_{0.33}(Na_{0.33})Si_{3.67}O_{10}(OH)_2$ |
| sauconite | $[Zn_{1.48}Mg_{0.14}Al_{0.74}Fe^{3+}][Al_{0.99}Si_{3.01}]$ $O_{10}(OH)_2X_{0.33}$ |

(X=halogen) as well as $Cu^{2+}$-, $CO^{2+}$- or $Ni^{2+}$-containing types, such as volkonskoite, medmontite or pimelite.

Such sheet silicates may be used individually or as mixtures of 2 or more sheet silicates and may contain the usual impurities for these natural products, as are normal e.g. in bentonite (=montmorillonite with traces of fledspar, quartz, etc.).

The sheet silicates described as "montmorillonite types" are preferred, and montmorillonite itself is particularly preferred. The aluminosilicates specified may be used in the natural form, the partially dried state or optionally also acid-activated. The acid activation is carried out by treatment with acids, preferably mineral acids.

Any mixtures of the aforementioned zeolites and/or sheet silicates can also be used.

Layers of aluminosilicates useful according to the invention are columns, tubes or other containers, that can be provided with the aluminosilicates to be used according to the invention.

The amount of aluminosilicate per liter of polycarbonate solution and polyester carbonate solution is 0.1 g to 100 g, preferably 1 g to 20 g.

Suitable solvents for the solution of the polycarbonates or polyester carbonates to be purified are first of all those that are used in the production of the polycarbonates or of the polyester carbonates, and thus preferably $CH_2Cl_2$, chlorobenzene and their mixtures.

Other suitable solvents are ethers, as for example tetrahydrofuran.

Suitable non-solvents for the precipitation of the polycarbonates or of the polyester carbonates are alcohols such as methanol, ethanol, propanol or isopropanol or alkanes such a pentane, hexane, heptane, octane, isooctane or cyclohexane.

The solvent can be evaporated in known manner by means of evaporative extruders at temperatures between 60° C. and 300° C.

The polycarbonates or polyester carbonates purified according to the invention are isolated either, after evaporation of the solution, by way of the melt and subsequent granulation or, after precipitation from the solution, by filtration and drying in well-known apparatuses. Beforehand, however, the aluminosilicates used for purification are removed in known manner by filtration from the purified polycarbonate solutions or polyester carbonate solutions.

The polycarbonates purified according to the process of the invention are free from low-molecular organic compounds or in any case have them in the following amounts:

| | |
|---|---|
| diphenols: | <5 ppm |
| chain stoppers: | <10 ppm |
| branching agents: | <10 ppm |
| bisdiphenol monocarbonates: | <10 ppm |
| bisaryl monocarbonates: | <10 ppm |
| oligocarbonates of diphenols with degrees of polymerization of 2 to 6: in each case | <10 ppm |

The polyester carbonates purified according to the process of the invention are likewise free from low-molecular organic compounds or in any case have them in the following amounts:

| | |
|---|---|
| diphenols: | <5 ppm |
| aromatic dicarboxylic acids | <10 ppm |
| chain stoppers: | <10 ppm |
| branching agents: | <10 ppm |
| bisdiphenol monocarbonates: | <10 ppm |
| bisaryl monocarbonates: | <10 ppm |
| dicarboxylic acid mono- and bisaryl esters: | <10 ppm |
| dicarboxylic acid bisdiphenol esters: | <10 ppm |
| dicarboxylic acid mono- and bisalkyl esters: | <10 ppm |
| oligocarbonates of diphenols with degrees of polymerization of 2 to 6: in each case | <10 ppm |
| oligoesters of dicarboxylic acids and diphenols with degrees of polymerization of 2 to 6: in each case | <10 ppm |

The polycarbonates or polyester carbonates purified and isolated according to the process of the invention not only have an extremely low content of low-molecular constituents but also consequently have a high molecular uniformity. They can accordingly be used advantageously everywhere where a uniform, good property profiled and processing at extremely high temperatures, optionally with application of a vacuum, to fine-grained moulded bodies are required. They can therefore be used in particular in the fields of electronics and optics.

The polycarbonates and polyester carbonates purified according to the process of the invention can be provided, already after separation of the aluminosilicates, but still before the isolation, with the usual additives for polycarbonates or for polyester carbonates, such as stabilizers, mould release agents, antistatic agents, flameprooofing agents and/or colour concentrates in the usual amounts. However, these additives can also be added to the polycarbonates and to the polyester carbonates after their isolation in the course of production of the moulded bodies.

This is carried out in known manner by means of well-known machines, for example at temperatures between 200° C. and 360° C., in internal kneaders, extruders or double-shafted screws by melt compounding or melt extrusion.

The additives can be admixed in known manner both successively and simultaneously at room temperature and also at elevated temperatures.

The polycarbonates and polyester carbonates obtainable according to the invention can be processed to any moulded bodies, not only in the fields of electronics and optics, as already mentioned, but also in the field of domestic technology, in the automatic industry, in the building sector, including the gardening sector, and in the medical sector, for example to syringes and dialyzers. This processing can be carried out in known manner by means of conventional machines.

EXAMPLES

In the following examples, polycarbonates based on bisphenol A with a relative solution viscosity (ηrel.) (0.5 g in 100 ml dichloromethane at 25° C.) of 1.288 is used.

EXAMPLE 1

A 14% chlorobenzene solution of the polycarbonate was stirred at 80° C. for 8 h with 10 wt % Na zeolite X (calculated on polycarbonate), then diluted with dichloromethane, filtered and dried at 120° C./water-jet pump vacuum.

EXAMPLE 2

Like Example 1, but with Na zeolite Y.

EXAMPLE 3

Like Example 1, but with H mordenite.

EXAMPLE 4

Like Example 1, but with H mordenite and the product obtained from Example 3; which means the product already purified according to Example 3 has been purified once more.

Results:

| | Comparison | Example 1 | Example 2 | Example 3 | Example 4 |
|---|---|---|---|---|---|
| Substance | polycarbonate | polycarbonate Na zeolite X | polycarbonate Na zeolite Y | polycarbonate H mordenite | polycarbonate H mordenite |
| Phenol | 31 ppm | <10 ppm | <10 ppm | <10 ppm | <10 ppm |
| Bisphenol A | 30 ppm | <10 ppm | <5 ppm | <5 ppm | <5 ppm |
| Diphenyl carbonate | 890 ppm | 390 ppm | 280 ppm | 280 ppm | <10 ppm |
| Phenolic-OH-terminated oligocarbonates* | 450 ppm | 190 ppm | 160 ppm | 230 ppm | <50 ppm |
| Se (1 to 6) | | | | | |
| n = 1 | 52 ppm | <10 ppm | <10 ppm | <10 ppm | <10 ppm |

-continued

Results:

| | Comparison | Example 1 | Example 2 | Example 3 | Example 4 |
|---|---|---|---|---|---|
| n = 2 | 73 ppm | 40 ppm | <10 ppm | 40 ppm | <10 ppm |
| n = 3 | 87 ppm | 50 ppm | 20 ppm | 60 ppm | <10 ppm |
| n = 4 | 95 ppm | 40 ppm | 40 ppm | 60 ppm | <10 ppm |
| n = 5 | 110 ppm | 60 ppm | 100 ppm | 100 ppm | <10 ppm |
| n = 6 | 39 ppm | | | | <10 ppm |
| ηrel. | 1.288 | 1.282 | 1.283 | 1.286 | 1.286 |

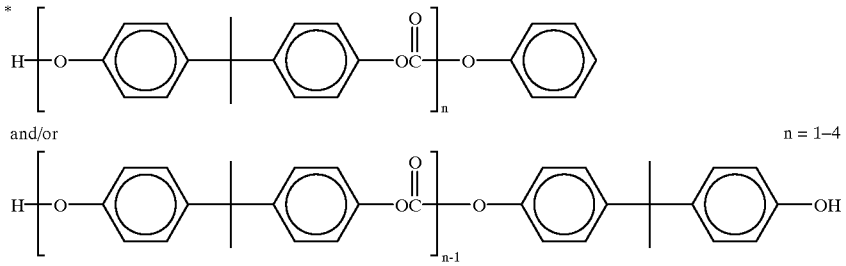

We claim:

1. A process for the purification of a solution of an aromatic carbonate polymer comprising (i) combining said solution with aluminosilicate *selected from the group consisting of aluminosilicate in natural form, partially dried aluminosilicate state and acid activated alumiosilicate,*

(ii) filtering said solution to separate said aluminosilicate, and (iii) isolating the carbonate polymer, said carbonate polymer being at least one member selected from the group consisting of polycarbonate and polyester carbonate having a weight average molecular weight of about 10,000 to 200,000, said combining consisting of one of (a) agitating and (b) passing through at least one layer of said aluminosilicate, said solution containing about 1 to 30 percent relative to its weight of said carbonate polymer, said purification being carried out at temperatures between 10° and 110° C. under pressure of 0 to 10 bar and at a reaction time of 3 to 600 minutes, said purification denoting the virtual freeing of said solution from organic constituents having low molecular weights *said aluminosilicate being present at an amount of about 1 gram to 20 gram per 1 liter of said solution*.

2. The process of claim 1 wherein combining consists of agitating said solution with aluminosilicate.

3. The process of claim 1 wherein said combining consists of passing said solution through at least one layer of aluminosilicate.

4. The polycarbonate prepared in accordance with the process of claim 1.

5. The polyester carbonate prepared in accordance with the process of claim 1.

6. The mixture of polycarbonate and polyester carbonate prepared in accordance with the process of claim 1.

7. The process of claim 1 wherein said aluminosilicate is a zeolite.

8. The process of claim 1 wherein said aluminosilicate is a sheet silicate or pillard clay.

9. The process of claim 1 wherein said aluminosilicate is a member relected from kaolin types, serpentine types and montmorillonite types.

[10. The process of claim 1 wherein said aluminosilicate is present at an amount of about 0.1 gram to 100 gram per 1 liter of polycarbonate solution.]

[11. The process of claim 10 wherein said aluminosilicate is present in an amount of about 1 gram to 20 gram per 1 liter of polycarbonate solution.]

*12. The process of claim 7 wherein said zeolite is selected from the group consisting of Na zeolite X, Na zeolite Y and H mordenite.*

* * * * *